United States Patent [19]

Miller et al.

[11] 3,878,110

[45] Apr. 15, 1975

[54] CLAY-FREE AQUEOUS SEA WATER DRILLING FLUIDS CONTAINING MAGNESIUM OXIDE OR CALCIUM OXIDE AS AN ADDITIVE

[75] Inventors: George L. Miller, Houston, Tex.; Horst K. F. Barthel, Hamburg, Germany

[73] Assignees: Oil Base, Inc., Houston, Tex. ; by said Miller; Oil Base Germany G.m.b.H., Hamburg, Germany; by said Barthel

[22] Filed: Oct. 24, 1972

[21] Appl. No.: 300,389

[52] U.S. Cl. ............ 252/8.5 B; 252/8.5 C; 166/314
[51] Int. Cl. ............................................ E21c 41/10
[58] Field of Search ........ 252/8.5 B, 8.5 A; 166/314

[56] References Cited
UNITED STATES PATENTS

| | | | |
|---|---|---|---|
| 2,789,949 | 4/1957 | Scotty | 252/8.5 B |
| 2,856,356 | 10/1958 | Weiss et al. | 252/8.5 B |
| 3,084,121 | 4/1963 | Wiener | 252/8.5 B |
| 3,148,970 | 9/1964 | Smith et al. | 252/8.5 B |
| 3,185,642 | 5/1965 | Sawyer et al. | 252/8.5 B |
| 3,319,715 | 5/1967 | Parks | 252/8.5 C |

*Primary Examiner*—Benjamin R. Padgett
*Assistant Examiner*—B. Hunt
*Attorney, Agent, or Firm*—John F. Lynch

[57] ABSTRACT

An aqueous drilling fluid is provided containing dolomite, magnesium sulfate, calcium sulfate, starch or a similar polymeric fluid loss material and a small amount of calcium oxide or magnesium oxide in a brine solution.

20 Claims, No Drawings

CLAY-FREE AQUEOUS SEA WATER DRILLING FLUIDS CONTAINING MAGNESIUM OXIDE OR CALCIUM OXIDE AS AN ADDITIVE

BACKGROUND OF THE INVENTION

This invention relates to a novel aqueous drilling mud composition. More particularly, the instant invention relates to a novel acid soluble aqueous sea water drilling fluid comprising primarily calcium and magnesium compounds and being free of heavy metal salts, and not requiring a swellable clay.

A wide variety of aqueous drilling fluids have long been known in the art. Many of the most widely used aqueous drilling fluids are based upon the chrome lignosulfonates or other heavy metal salts in combination with lignin derivatives and used with clays of one type or another. Although these heavy metal salt-containing muds usually perform satisfactorily in drilling applications, they present a disposal problem particularly when used in offshore drilling operations or in many cases even in land drilling operations. Because of the poisonous nature of these compositions, particularly the heavy metal component, it may be necessary to carry all the mud and/or drill cuttings to shore in drums for disposal.

In addition, many prior art aqueous drilling muds are not easily formulated using sea water, and at times do not perform very satisfactorily, thus necessitating the expense of transporting fresh water to the offshore location to formulate the mud.

Accordingly, an acid soluble aqueous drilling fluid readily formulated with sea water and composed of components of a non-poisonous nature would be highly advantageous.

A further problem exists when drilling subsurface formations of heaving or swelling shale with conventional aqueous drilling fluids. These shales have a tendency to swell or disintegrate in the presence of many conventional water base muds due to migration of water into the shale resulting in instability of the borehole wall and severe losses of gauge.

In an attempt to solve problems presented by these shales, muds based upon magnesium oxide in brine solutions have been proposed. For example, U.S. Pat. No. 2,856,356 suggests the use of a mud comprising a saturated magnesium hydroxide solution containing a solubilizing agent which is an ammonium compound. In addition, German Pat. No. 1,020,585 suggests a magnesium hydroxide-magnesium oxide mud. However, the mud utilized included natural, mined Bohr Magnesia which also contains ammonium chloride. These muds typically use as a fluid loss agent starch or a polymeric material with the magnesium compounds.

These muds although perhaps operative do not have the high temperature characteristics and the necessary resistance to fluid loss, particularly at the high temperatures to which a commercial drilling fluid is frequently subjected. Modern wells are reaching increasingly great depths where relatively high bottom hole temperatures can be a problem.

Furthermore, although salt water itself is somewhat corrosive, the formulation of a salt water mud using ammonium compounds increases corrosion problems. It would therefore be desirable to formulate a salt water mud having minimal corrosive properties.

SUMMARY OF THE INVENTION

There is provided by the instant invention a novel clay-free, minimally corrosive aqueous drilling fluid composed of constituents which can be used with sea water or brine formulations. The drilling fluid utilizes comparatively inexpensive ingredients which are generally considered to be non-poisonous, and results in a drilling fluid having good biological properties and good resistance to high temperatures.

In a particular aspect the novel drilling fluid of the invention is formulated with magnesium sulfate and a dolomite together with a small amount of magnesium oxide or calcium oxide in a brine solution. The brine solution may be made from sea water. A particular advantage of this composition is that it can be made acid soluble whereas clay-water muds are not acid soluble.

In the novel drilling fluid of the invention, the small amount of calcium oxide or magnesium oxide appears to serve as a catalyst or a promoter for the system affording good rheological properties and good fluid loss characteristics even after exposure to relatively high temperature stability. The mechanism is not fully understood.

The mud of this invention is formulated from a mud solids system comprising about 30 to 70 percent by weight dolomite, about 20 to 60 percent by weight magnesium sulfate (measured as magnesium sulfate heptahydrate or epsom salts), about 3 to 10 percent by weight of calcium or magnesium oxide or a mixture thereof, and in the preferred embodiment, about 3 to 15 percent by weight gypsum (calcium sulfate). Formations containing calcium sulfate are typically encountered in drilling and hence gypsum is preferred as a mud solids system constituent. These components are then formulated with a brine solution which tyically contains additional dissolved salts as will be explained hereinbelow.

In formulating the mud, the mud solids system is added to water in an amount ranging from 5 to 175 pounds per barrel. It will be understood that when small amounts, such as 5 to 10 pounds per barrel of the solids system is used, there is provided a drilling fluid having greater loss and not possessing the rheology to support any significant amount of weighting material. Still in shallow wells, such drilling fluids do enable the achieving of high penetration rates. To formulate a mud having minimum fluid loss and possessing rheological properties sufficient to enable being weighted to 12 to 20 pounds per gallon, it is generally necessary to add at least about 40 to 50 pounds of the mud solids system of this invention. Hence, more typically, the muds of this invention will be formulated using 50 to about 175 pounds per barrel of the mud solids system.

Starch is preferably added to the system as a fluid loss agent in an amount of from about 10 to about 30 pounds per barrel. Pregelatinized or prehydrolyzed starch is typically employed. Other fluid loss agents such as polymeric fluid loss resins including, for example, urea resins, can be used.

Weighting agents, such as galena, iron oxide, barite, and the like, may be added to adjust the mud weight of the novel drilling fluid disclosed herein. With iron oxide as the weighting agent, the total mud system can be made substantially acid soluble.

Inasmuch as the novel mud of this invention can be formulated by adding a powdered mixture of materials, which materials are typically sacked for use, the combination of these materials is referred to as the "solids system." This reference should not imply that all these constituents remain as undissolved solids once the mud is formulated.

The brine solution into which the mud solids system is added may be formulated from fresh water or sea water, with sufficient salts or electrolytes added to adjust the drilling fluid to the formation to be drilled.

DESCRIPTION OF THE SPECIFIC AND PREFERRED EMBODIMENTS

In a particular preferred embodiment, the drilling fluid of the instant invention may be formulated using the following amounts of the various ingredients in a barrel of sea water:

36 pounds dolomite (dolomitic limestone)
4.5 pounds gypsum
4.5 pounds calcium oxide or dolomitic quicklime
15 pounds magnesium sulfate (heptahydrate form)
15 pounds potassium chloride The potassium chloride is employed to provide an additional salt or electrolyte content to the sea water in order to stabilize the clay or shale formation around the borehole. It will be appreciated that the choice of the dissolved salts in the aqueous phase will be dictated primarily by the nature of the formations being drilled. Thus, in the Western and Gulf coastal regions of the United States, potassium chloride or perhaps sodium chloride would be satisfactory in amounts up to about 50 pounds per barrel for increasing the salt content of the drilling fluid. If, however, formations containing magnesium chloride (e.g., carnallite or bischofite) were expected to be encountered, then the fluid would preferably be formulated by including magnesium chloride in a sufficient amount. Accordingly the formulation of the drilling fluid should be undertaken in view of the content of the formations to be drilled in order to provide an aqueous phase which will have a minimal swelling effect in the formation, and which preferably stabilizes the formation. Other salts, for example, sodium chloride, calcium chloride, and the like, may be used for such purpose depending on the nature of the formation. An increase in salt content, however, should be kept to the minimum level necessary to maintain the gauge of the hole since increased salt contents tend to lend to higher fluid losses.

In Europe, it is much more common to drill through salt formations, containing magnesium chloride (carmallite and bischofite), magnesium sulfate (allenite, kiescrite, and "bitter salts") and hence, it is usually preferred to provide much higher salt content to the brine. Thus, up to about 170 pounds of salt may be used per barrel. Thus, the magnesium sulfate constituent can perform the additional function of contributing salt content to the mud when formations containing MgSO$_4$ are being drilled. In such instances, an amount of magnesium sulfate at the upper end of the range given for the solids system would be used recognizing that the salt is for two purposes.

Dolomite is a carbonate of calcium and magnesium. Dolomitic limestone is a limestone in which calcium carbonate is dominant over magnesium carbonate. For example, a satisfactory and commercially available dolomitic limestone contains about 55 percent by weight calcium carbonate and about 44 percent magnesium carbonate, there being other materials present in trace amounts of less than ½ percent. If desired, magnesium carbonate alone may be employed or a combination of magnesium carbonate and clacium carbonate derived from sources other than dolomite could be employed. Because of the reduced expense, dolomitic limestone is a preferred source of these constituents. If so combined, the magnesium carbonate should be present in an amount corresponding to at least about 35 percent by weight.

The dolomitic limestone used is preferably finely ground. The material should have a particle size such that no more than about 10 percent, preferably no more than 5 percent is retained on a 100 mesh screen. Desirably about 50 to 65 percent will pass 200 mesh. Finer materials may be used, but expense is again a factor.

Dolomitic quicklime is produced by burning dolomitic limestone to obtain a material containing calcium oxide and magnesium oxide. A commercially available and satisfactory material contains by weight about 57.5 percent calcium oxide and about 41.5 percent magnesium oxide, the remainder being small amounts of various impurities. The dolomitic quicklime is preferably finely ground to a particle size such that substantially all the particles will pass through a 16 mesh or finer screen.

Another preferred formulation wherein a high concentration of dissolved salt is provided for the brine includes per barrel of sea water:

47 pounds dolomite (dolomitic limestone)
4 pounds gypsum
4 pounds calcium oxide or dolomitic quicklime
54 pounds magnesium chloride
60 pounds magnesium sulfate (epsom salt)
15 pounds potassium chloride
36 pounds sodium chloride As noted above, the magnesium sulfate in this case serves its function in the mud and acts to increase the brine content with magnesium sulfate in anticipation of drilling through formations containng this salt. But it is pointed out that if no allenite or like formations were anticipated, the amount of magnesium sulfate could be reduced to about 15 to 30 pounds. Perhaps other salts would be needed in view of the formations to be drilled. This particular formula is typical of formula usable in European drilling operations.

In this particular embodiment, the dolomite, gypsum, and calcium oxide or dolomitic quicklime may be mixed and placed in one 55 pound sack for commercial use, with the remaining salts being mixed and stored in three 55 pound sacks. When the mud is to be prepared, the four sacks are mixed with a barrel of sea water to form the drilling fluid. Starch or other fluid loss agents and weighting materials can also be mixed in the drilling fluid at this time. The mud can be weighted to over 20 pounds per gallon.

Starch is preferably included in a drilling fluid in accordance with the invention in an amount sufficient to control fluid loss to the desired level and enhance the rheological qualities of the fluid. If the mud is running at high temperatures, it will be necessary to periodically add starch to maintain rheology and fluid loss characteristics. Any suitable pregelatinized starch may be employed, but a mixture of 3 parts corn starch to 1 part tapioca starch has been found to be satisfactory. About 10 to 30 pounds per barrel is sufficient as an initial concentration.

A pH control agent such as calcium hydroxide may be added to the drilling fluid of the present invention if necessary, although the calcium oxide of the solids system will act both as a promoter of the mechanism involved and as a source of calcium hydroxide. If magnesium oxide is used as the sole promoter, some calcium hydroxide will be necessary for pH control. Ordinarily, the pH of the drilling fluid of the invention should be kept between about 8.5 and 9.5 or 10.

It has also been found in accordance with the invention that calcium hydroxide or magnesium hydroxide will not promote the mechanism involved nearly so well as calcium oxide, magnesium oxide, or dolomitic quicklime. Calcium hydroxide results in muds which have high fluid losses and unsatisfactory rheology after exposure to temperatures of 250° F. Magnesium hydroxide muds appear to maintain good fluid loss properties, but again rheology is unsatisfactory. Particularly for providing a mud which is capable of being weighted to any significant extent. In this regard, one should be careful to keep the oxide component from slacking too much prior to mixing with the dolomite and/or magnesium sulfate portion. After mixing has occurred, the mix may be sacked in conventional sacks prior to formulating the drilling fluid. Surprisingly, however, it has been found that once the system is mixed, somewhat better properties in the ultimate mud are obtained if the mixture is permitted to remain in some contact with the air rather than if the mixture is maintained hermetically sealed. This would seem to indicate that the slacking of the oxide in the presence of the other constituents has a beneficial effect on the chemical system of the mud. Consequently, once the solids are admixed, they may be sacked in conventional sacks and hermetic sacks are not required.

The $MgSO_4$ component of the solids system can be partially supplied by sea water or other sources connected with the drilling fluid. And as indicated above, in some situations, an excess of $MgSO_4$ is desirable to promote stability of gauge in the borehole depending on the chemical characteristics of the formation being drilled.

The muds of this invention may be employed weighted or unweighted. Weighting agents such as barite, iron oxide, galena or the like may be used to weight the mud up to 20 or 22 pounds per barrel. Iron oxide is preferred since it enables formulating a substantially completely acid soluble system.

Testing of unweighted drilling fluid in accordance with the invention was conducted to determine apparent viscosity (Va), plastic viscosity (Vp) and yield point (YP) and 10 second gel strength on a Fann Meter (Model 35) at room temperature. Tests on the rheological properties were conducted on both the initial gel and after hot-rolling the sample for an extended period at high temperature. Unless otherwise noted, the hot rolling involved rotating the sample for 17 hours at 250° F.

API fluid loss (API FL) was measured in a filter press at room temperature, 100 psi, for 30 minutes. Cake was measured in accordance with standard procedures. High temperature-high pressure fluid loss (HT-HP) was measured in a suitable filter press for 30 minutes at 250° F. and 500 psi, unless otherwise noted.

In the following examples, all concentrations are expressed in pounds per 42 gallon barrel of water. The notation "MS" refers to a mixture of salt consisting of by weight 50 percent $MgCl_2$, 8 percent $MgSO_4$, 10 percent KCl, and 32 percent NaCl. Starch employed was a mixture of 3 parts corn starch to 1 part tapioca flour.

The mixture of starches used in the following examples included a pregelatinized corn starch and tapioca flour which was not pregelatinized having a comparatively low gelatinization temperature of 145° F. Pregelatinization, therefore, is not absolutely essential.

Those skilled in the art will be familiar with selection of other additives which may be used in the compositions of this invention. As mentioned above, bacteriacides may be used to protect the starch from bacteria which may exist in the water used. Similarly, defoaming agents and other polymeric fluid loss agents known in the art may be employed in these fluids. In selecting the ingredients of this invention, those skilled in the art can choose particle size. For example, iron oxide weighting agents used herein may be very fine (97 percent through 200 mesh, 90 percent through 325 mesh) to reduce abrasivity of the mud, though using a fine weight material generally increases the rheology of the fluid. Also, it will be appreciated that iron oxide commercially available for use as a weighting material may contain small amounts of non acid soluble materials, e.g., silica, barite or the like. Nonetheless, the use of such iron oxide materials (containing at least about 80 percent iron oxide) still renders the mud substantially acid soluble within the meaning used herein. Other variations will be apparent to those skilled in the art.

EXAMPLES 1 TO 6

A series of tests were conducted which demonstrate the feasibility of a drilling fluid in accordance with the invention. Results are illustrated in Tables I and II. The dolomite was a finely ground dolomitic limestone from Europe, and each of the samples also included 20 pounds per barrel of starch. The sample with $Ca(OH)_2$ but without any CaO or MgO present (Example 6) is not a practical drilling fluid. The examples also show that the drilling fluid may be formulated from either fresh or sea water.

TABLE I

Components in Drilling Fluid in Pounds per Barrel of Water

|  | MS | $MgSO_4$ | Dolomite | $CaSO_4$ | $Ca(OH)_2$ | CaO | MgO | Water Phase |
|---|---|---|---|---|---|---|---|---|
| Example 1 | 100 | 50 | 50 | 5 | — | 5 | — | Sea |
| Example 2 | 100 | 25 | 35 | 5 | — | 5 | — | Sea |
| Example 3 | 100 | 50 | 35 | 5 | — | 5 | — | Sea |
| Example 4 | 100 | 50 | 27 | 5 | — | 3 | — | Fresh |
| Example 5 | 100 | 50 | 27 | 5 | 1 | — | 2.5 | Fresh |
| Example 6 | 100 | 50 | 27 | 5 | 3 | — | — | Sea |

TABLE II

Test results on examples (I=initial; HR—after hot rolling)

|  | Example 1 I | HR | Example 2 I | HR | Example 3 I | HR | Example 4 I | HR | Example 5 I | HR | Example 6 I | HR |
|---|---|---|---|---|---|---|---|---|---|---|---|---|
| Va (cps) | 16 | 20 | 13 | 11 | 14 | 14 | 11 | 12 | 13 | 19 | 11.5 | 9 |
| Pv (cps) | 12 | 15 | 9 | 9 | 10 | 12 | 9 | 10 | 10 | 14 | 9 | 8 |
| YP (pcsf) | 8 | 10 | 8 | 4 | 8 | 4 | 4 | 4 | 6 | 10 | 5 | 2 |
| 10 second gel (pcsf) | 4 | 5 | 4 | 3 | 3 | 2 | 0.5 | 0.5 | 2 | 3 | 2 | 1 |
| pH | 8.8 | 8.8 | 8.7 | 8.4 | 8.7 | 8.4 | 9.1 | 8.9 | 9.1 | 8.9 | 8.5 | 8.3 |
| API FL. (cc) | 2.7 | 3.7 | 2.9 | 2.3 | 3.0 | 2.2 | 2.2 | 2.6 | 3.0 | 3.2 | 5.0 | 1.9 |
| Cake (in) | 1/32 | 1/32 | 1/32 | 1/32 | 1/32 | 1/32 | 1/32 | 1/32 | 1/32 | 1/32 | 2/32 | 1/32 |
| HT-HP | — | 27.8 | — | 38.0 | — | 51.2 | — | 43.0 | — | 30.0 | — | 54.0 |
| Observations After Aging | Medium Gel; No Settling | | Light to Medium Gel; No Settling | | Light to Medium Gel; No Settling | | Light Gel; No Settling | | Light Gel; No Settling | | Light Gel; No Settling | |

EXAMPLES 7 TO 8

The following tests were conducted with the drilling fluid consisting of sea water and per barrel 25 pounds hydrous $MgSO_4$ (epsom salt), 35 pounds dolomitic limestone mined in Oklahoma, 5 pounds $CaSO_4$, 15 pounds KCl and 20 pounds starch; Example 7 also including 3 pounds CaO while Example 8 contained 3 pounds MgO. As will be noted in Table III, the rheological properties of the two fluids are very similar.

TABLE III

Test Results on Examples (I=initial; HR=after hot rolling)

|  | Example 7 I | HR | Example 8 I | HR |
|---|---|---|---|---|
| Va (cps) | 15 | 13 | 15 | 14 |
| Pv (cps) | 12 | 11 | 12 | 12 |
| YP (pcsf) | 6 | 4 | 6 | 4 |
| 10 second gel (pcsf) | 2 | 2 | 2 | 1 |
| pH | 9.3 | 9.2 | 9.3 | 9.1 |
| API FL (cc) | 1.2 | 1.6 | 1.6 | 1.1 |
| Cake (in) | 1/32 | 1/32 | 1/32 | 1/32 |
| HT-HP | — | 8.0 | — | 7.2 |
| Observations After Aging | Light Gel; No Settling | | Light Gel; No Settling | |

EXAMPLES 9 AND 10

Two samples of drilling fluid were made, each consisting of fresh water and per barrel 15 pounds KCl, 50 pounds epsom salt, 27 pounds dolomite, 5 pounds gypsum, 3 pounds CaO, and 20 pounds starch. The dolomite in Example 9 was a finely ground Oklahoma dolomitic limestone of a particle size over 95 percent of which would pass through a 300 mesh screen. The dolomite in Example 10 was obtained from the same source but it was ground to such particle size that over 95 percent would pass through a 100 mesh screen. The test results in Table IV illustrate that the extra cost of the extremely finely ground dolomite is not warranted.

TABLE IV

Test Results on Examples (I=initial; HR=after hot rolling)

|  | Example 9 I | HR | Example 10 I | HR |
|---|---|---|---|---|
| Va (cps) | 15 | 16 | 16 | 17 |
| Pv (cps) | 11 | 14 | 12 | 14 |
| YP (pcsf) | 8 | 4 | 8 | 6 |
| 10 second gel (pcsf) | 2 | .5 | 2 | .5 |
| pH | 9.5 | 9.0 | 9.6 | 9.0 |
| API FL (cc) | 1.9 | 1.5 | 2.0 | 1.7 |
| Cake (in) | 1/32 | 1/32 | 1/32 | 1/32 |
| HT-HP | — | 15.4 | — | 18.4 |
| Observations After Aging | Light Gel; No Settling | | Light Gel; Trace of Top and Bottom Settling | |

EXAMPLES 11 TO 14

Three samples of a drilling fluid were prepared from fresh water and per barrel 100 MS, 50 pounds epsom salt, 27 pounds European dolomitic limestone, 5 pounds gypsum, and 20 pounds starch. Example 11 also contained 1 pound $Ca(OH)_2$, Example 12 1 pound $Ca(OH)_2$ and 2.5 pounds MgO, and Example 13, 3 pounds CaO. Example 14 was the same as Example 13 except that sea water was used. The results in Table V show that the $Ca(OH)_2$ does not promote the gel mechanism sufficiently for a practical drilling fliud, while Examples 13 and 14 illustrate that the drilling fluid can be formulated from either fresh or sea water.

TABLE V

Test Results on Examples (I=initial; HR=after hot rolling)

|  | Example 11 I | HR | Example 12 I | HR | Example 13 I | HR | Example 14 I | HR |
|---|---|---|---|---|---|---|---|---|
| Va (cps) | 11 | 10 | 13 | 19 | 11 | 12 | 14 | 14 |
| Pv (cps) | 10 | 9 | 10 | 14 | 9 | 10 | 10 | 10 |
| YP (pcsf) | 2 | 2 | 6 | 10 | 4 | 4 | 8 | 8 |
| 10 second gel (pcsf) | 2 | .5 | 2 | 3 | .5 | .5 | 2 | 2 |
| pH | 8.9 | 8.4 | 9.1 | 8.9 | 9.1 | 8.9 | 8.5 | 8.6 |
| API FL (cc) | 1.8 | 2.0 | 3.0 | 3.2 | 2.2 | 2.6 | 4.0 | 1.9 |
| Cake (in) | 1/32 | 1/32 | 1/32 | 1/32 | 1/32 | 1/32 | 2/32 | 1/32 |
| HT-HP | — | 120.0 | — | 30.0 | — | 43.0 | — | 45.0 |
| Observations After Aging | Light Gel Trace of Top and Bottom Settling | | Light Gel No Settling | | Light Gel No Settling | | Light Gel No Settling | |

EXAMPLES 15 TO 20

Six samples of an unweighted drilling fluid were made by mixing in sea water per barrel 15 pounds epsom salt, 15 pounds KCl, 36 pounds Oklahoma dolomitic limestone, 5 pounds gypsum, and 20 pounds starch. Example 15 also included 3 pounds CaO; Example 16, 4-pounds Ca(OH)$_2$; Example 17, 3-pounds MgO; Example 18, 4-pounds Mc(OH)$_2$; Example 19, 3-pounds No. 16 mesh dolomitic quicklime; and Example 20, 3-pounds of 100 mesh dolomite quicklime. The CaO and the dolomitic quicklime were heated for 30 minutes at 600°C. prior to use to eliminate slacking. Rheological tests were conducted as shown in Table VI. These tests illustrate that CaO, MgO, and dolomitic quicklime are better as promoters in the solids system than either Ca(OH)$_2$ or Mg(OH)$_2$.

The rheological properties after hot rolling are illustrated in Table VII. The results show that too much CaO leads to an unacceptable product (note Example 26) and that yield point is significantly improved with an increased dolomite content (compare Examples 21 and 22).

EXAMPLES 27 TO 32

Several samples of unweighted drilling fluid were made by mixing sea water and per barrel 20 pounds starch, 15 pounds KCl, and the following ingredients in pounds per barrel of water:

|  | Epsom Salt | Dolomitic Limestone | Gypsum | CaO | MgO |
|---|---|---|---|---|---|
| Example 27 | 25 | 35 | 5 | 3 | — |
| Example 28 | 25 | 35 | 5 | — | 3 |
| Example 29 | 25 | 35 | 5 | 3 | — |
| Example 30 | 20 | 35 | 5 | 3 | — |
| Example 31 | 15 | 35 | 5 | 3 | — |
| Example 32 | 15 | 50 | 5 | 3 | — |

The rheological test results illustrated in Table VIII indicate that the yield point of the fluid is affected beneficially by adjusting the relative amounts of the ingredients.

TABLE VI

Test results on examples (I=initial; HR—after hot rolling)

|  | Example 15 I | Example 15 HR | Example 16 I | Example 16 HR | Example 17 I | Example 17 HR | Example 18 I | Example 18 HR | Example 19 I | Example 19 HR | Example 20 I | Example 20 HR |
|---|---|---|---|---|---|---|---|---|---|---|---|---|
| Va (cps) | 17 | 12 | 16 | 12 | 15 | 13 | 15 | 8 | 15 | 13 | 16 | 12 |
| Pv (cps) | 14 | 10 | 14 | 12 | 13 | 11 | 12 | 7 | 12 | 11 | 13 | 11 |
| YP (pcsf) | 6 | 4 | 4 | 0 | 4 | 4 | 6 | 2 | 6 | 4 | 6 | 2 |
| 10 second gel (pcsf) | 2 | 0.5 | 1 | 0 | 1 | 0.5 | 1 | 0.5 | 1 | 1 | 2 | 0.5 |
| pH | 9.5 | 8.9 | 9.5 | 8.8 | 9.4 | 9.0 | 9.4 | 8.7 | 9.5 | 9.1 | 9.5 | 9.0 |
| API FL (cc) | 1.4 | 1.2 | 1.8 | 1.2 | 1.6 | 0.8 | 1.8 | 1.6 | 1.6 | 1.2 | 1.4 | 1.0 |
| Cake (in) | 1/32 | 1/32 | 1/32 | 1/32 | 1/32 | 1/32 | 1/32 | 1/32 | 1/32 | 1/32 | 1/32 | 1/32 |
| HT-HP | — | 26.8 | — | 40.4 | — | 6.4 | — | 6.0 | — | 8.8 | — | 7.2 |
| Observations After Aging | Light Gel; Trace top Settling & Bottom Settling | | Light Gel; Trace top Settling & Bottom Settling | | Light Gel; Trace top Settling & Bottom Settling | | Light Gel; Trace top Settling & Bottom Settling | | Light Gel; Trace top Settling & Bottom Settling | | Light Gel; Trace top Settling & Bottom Settling | |

EXAMPLES 21 TO 26

Samples of drilling fluid were made by mixing sea water and per barrel 20 pounds starch and the following ingredients:

Pounds per Barrel

|  | Epsom Salt | KCl | Dolomitic Limestone | Gypsum | CaO |
|---|---|---|---|---|---|
| Example 21 | 15 | 15 | 35 | 5 | 3 |
| Example 22 | 15 | 15 | 50 | 5 | 3 |
| Example 23 | 15 | 15 | 50 | 5 | 3 |
| Example 24 | 15 | 15 | 50 | 10 | 3 |
| Example 25 | 15 | 15 | 50 | 10 | 3 |
| Example 26 | 15 | 15 | 50 | 10 | 10 |

TABLE VII

Test results on examples (I=initial; HR—after hot rolling)

|  | Example 21 I | Example 21 HR | Example 22 I | Example 22 HR | Example 23 I | Example 23 HR | Example 24 I | Example 24 HR | Example 25 I | Example 25 HR | Example 26 I | Example 26 HR |
|---|---|---|---|---|---|---|---|---|---|---|---|---|
| Va (cps) |  | 16 |  | 18 |  | 18 |  | 19 |  | 19 |  | 13 |
| Pv (cps) |  | 14 |  | 15 |  | 15 |  | 16 |  | 16 |  | 10 |
| YP (pcsf) |  | 2 |  | 6 |  | 6 |  | 6 |  | 6 |  | 6 |
| 10 second gel (pcsf) |  | 1 |  | 2 |  | 2 |  | 2 |  | 2 |  | 4 |
| pH |  | 9.2 |  | 9.2 |  | 9.2 |  | 9.3 |  | 9.3 |  | 12.1 |
| API FL (cc) |  | 1.3 |  | 1.4 |  | 1.4 |  | 1.2 |  | 1.2 |  | Unc.* |
| Cake (in) |  | 1/32 |  | 1/32 |  | 1/32 |  | 1/32 |  | 1/32 |  | — |
| HT-HP |  | 6.0 |  | 7.2 |  | 7.2 |  | 6.0 |  | 6.0 |  | Unc.* |
| Observations After Aging | Light Gel; Trace top Settling and Bottom Settling | | Light Gel; Trace top Settling and Bottom Settling | | Light Gel; Trace top Settling and Bottom Settling | | Light Gel; Trace top Settling and Bottom Settling | | Light Gel; Trace top Settling and Bottom Settling | | 1" water top settling; solids were flocculated | |

*Uncontrolled

TABLE VIII

Test results on examples (I=initial; HR—after hot rolling)

|  | Example 27 I | HR | Example 28 I | HR | Example 29 I | HR | Example 30 I | HR | Example 31 I | HR | Example 32 I | HR |
|---|---|---|---|---|---|---|---|---|---|---|---|---|
| Va (cps) | 15 | 13 | 15 | 14 | 14 | 13 | 13 | 11 | 16 | 14 | 18 | 15 |
| Pv (cps) | 12 | 11 | 12 | 12 | 12 | 11 | 11 | | 14 | | 15 | |
| YP (pcsf) | 6 | 4 | 6 | 4 | 4 | 4 | 4 | | 2 | | 6 | |
| 10 second gel (pcsf) | 2 | 2 | 2 | 1 | 2 | 2 | 2 | | 1 | | 2 | |
| pH | 9.3 | 9.2 | 9.3 | 9.1 | 9.0 | 9.1 | | | 9.2 | | 9.2 | |
| API FL (cc) | 1.2 | 1.6 | 1.6 | 1.1 | 1.1 | 1.9 | | | 1.3 | | 1.4 | |
| Cake (in) | 1/32 | 1/32 | 1/32 | 1/32 | 1/32 | 1/32 | | | 1/32 | | 1/32 | |
| HT-HP | — | 8.0 | — | 7.2 | 12.2 | 8.4 | | | 6.0 | | 7.2 | |
| Observations After Aging | Light Gel; No Settling | | Light Gel No Settling | | Light Gel; Trace top Settling & Bottom Settling | | Light Gel; Trace top Settling & Bottom Settling | | Light Gel; Trace top Settling & Bottom Settling | | Light Gel; Trace top Settling & Bottom Settling | |

EXAMPLES 33 TO 36

Four samples were made by mixing sea water and per barrel 15 pounds epsom salt, 15 pounds KCl, 36 pounds dolomitic limestone, 5 pounds gypsum, and 20 pounds starch. Example 33 also contained 4 pounds 16 mesh dolomitic quicklime which had been heated 30 minutes at 600°C; Example 34, 4-pounds of the same quicklime "as received;" Example 35, 4-pounds of 100 mesh dolomitic quicklime which had been heated for 30 minutes at 600°C.; and Example 36, 4pounds of the same quicklime as received. The test results are illustrated in Table IX.

TABLE X

Test results on examples (I=initial; HR=after hot rolling)

|  | Example 37 I | HR | Example 38 I | HR |
|---|---|---|---|---|
| Va (cps) | 15 | 13 | 14 | 15 |
| Pv (cps) | 11 | 11 | 11 | 13 |
| YP (pcsf) | 8 | 4 | 6 | 4 |
| 10 second gel (pcsf) | 4 | 1 | 2 | 1 |
| pH | 9.5 | 9.2 | 9.6 | 9.3 |
| API FL (cc) | 1.8 | 1.6 | 1.6 | 1.8 |
| Cake (in) | 1/32 | 1/32 | 1/32 | 1/32 |
| HT-HP | — | 26.8 | — | 9.6 |
| Observation After Aging | Light Gel; Trace Top Settling & Bottom Settling | | Light Gel; Trace Top Settling & Bottom Settling | |

TABLE IX

Test results on examples (I=initial; HR=after hot rolling)

|  | Example 33 I | HR | Example 34 I | HR | Example 35 I | HR | Example 36 I | HR |
|---|---|---|---|---|---|---|---|---|
| Va (cps) | 16 | 13 | 14 | 16 | 14 | 16 | 16 | 14 |
| Pv (cps) | 13 | 12 | 11 | 14 | 11 | 15 | 13 | 12 |
| YP (pcsf) | 6 | 2 | 6 | 4 | 6 | 2 | 6 | 4 |
| 10 second gel (pcsf) | 1 | 1 | 1 | 1 | 1 | 1 | 1 | 1 |
| pH | 9.4 | 9.0 | 9.4 | 9.0 | 9.5 | 9.0 | 9.4 | 9.0 |
| API FL (cc) | 2.0 | 1.5 | 2.1 | 1.2 | 1.8 | 1.2 | 2.0 | 1.1 |
| Cake (in) | 1/32 | 1/32 | 1/32 | 1/32 | 1/32 | 1/32 | 1/32 | 1/32 |
| HT-HP | — | 5.0 | — | 7.2 | — | 4.4 | — | 9.0 |
| Observation after aging | Light Gel; Trace top Settling & Bottom Settling | | Light Gel; Trace top Settling & Bottom Settling | | Light Gel; Trace top Settling & Bottom Settling | | Light Gel; Trace top Settling & Bottom Settling | |

EXAMPLES 37 AND 38

Two samples of mud materials were made by mixing, based on a barrel of sea water, 15 pounds epsom salt, 15 pounds KCl, 36 pounds dolomitic limestone, 5 pounds gypsum, and 4 pounds CaO. One sample, Example 37, was aged at 72°F. for 65 hours in a bottle with closed lid. The other, Example 38, was aged at 72° F. for 65 hours in a bottle without a lid. The samples were then mixed with sea water and per barrel of sea water 20 pounds of starch. The results are illustrated in Table X. The results seem to indicate that the aging of the dry mixture in contact with the atmosphere can possibly improve the rheological properties.

In other tests, USP-1 and USP-2 $MgSO_4$ were compared with use of the heptahydrate form, epsom salt. The results indicated that no significant change in the rheological properties of the drilling fluid was effected by using the purer forms of $MgSO_4$. Test results also indicate that the pH of the drilling fluid, although preferably maintained between about 8.5 and abut 9.5, may be as high as about 10.0. Test results also indicate that the calcium and/or magnesium oxide promoter should preferably be included at from about 2.5 to about 5 pounds per barrel. The particle sizes of the various components of the system may vary, but generally are satisfactory if substantially all of the particles pass through a 100 mesh or finer screen.

It will be apparent that the invention provides a mud system which is convenient to use and to control. The system includes no chemicals which are generally considered poisonous, and is compatible with sea water as the liquid component of the system. Of course, it will be understood that if bacterially contaminated sea water is used, a bacteriacide or biocide may be necessary to be employed in small amounts, generally for about 0.1 to no more than a pound per barrel. This will prevent the bacteria from attacking the starch. Non-poisonous biocides can be selected. It also may be necessary to add to a corrosion inhibitor if certain susceptible steels are used in the borehole. The compositions of this invention, however, are minimally corrosive. The system is also soluble in acid, permitting good repermeability of a formation after acid treatment. Another advantage is that the system can be tailored by the addition of salts to minimize swelling of a formation and to minimize loss of gauge in a borehole which will allow superior cementing of the borehole once drilling is completed.

What is claimed is:

1. A clay free drilling fluid comprising an aqueous brine solution and a solid additive system comprising magnesium sulfate and dolomite together with at least one of the oxides of magnesium and calcium as a promoter to a reaction to increase the vescosity of the fluid sufficiently to enable the fluid to be weighted to a denisty of from 12 to 20 pounds per barrel.

2. The drilling fluid defined in claim 1 wherein said solid additive system is present in an amount of 5 to 175 pounds per barrel of brine solution and comprises about 30 to 70 percent by weight dolomite, about 20 to 60 percent by weight magnesium sulfate (measured as the heptahydrate form) and from about 3 to 10 percent by weight of at least one of the oxides of calcium and magnesium.

3. The drilling fluid defined in claim 1 wherein said brine solution comprises sea water containing additional dissolved salts in an amount of at least about 15 pounds per barrel.

4. The drilling fluid defined in claim 2 wherein said solid additive system is present in an amount of at least 40 pounds per barrel.

5. The drilling fluid defined in claim 4 wherein between about 2.5 and about 5.0 pounds of at least one oxide of calcium and magnesium is present in said solid additive system.

6. The drilling fluid defined in claim 1 wherein the pH of the fluid is between about 8.5 and about 10.0.

7. The drilling fluid defined in claim 1 wherein said oxides of magnesium and calcium are present in the form of dolomitic quicklime.

8. The drilling fluid defined in claim 1 wherein said dolomite is dolomitic limestone.

9. The drilling fluid defined in claim 1 wherein said fluid includes starch in an amount of from about 10 to 20 pounds per barrel.

10. The drilling fluid of claim 9 wherein said starch comprises a mixture of 3 parts by weight pregelatinized corn starch to 1 part by weight tapioca flour.

11. The drilling fluid defined in claim 2 wherein said dolomite is dolomitic limestone containing at least about 35 percent by weight magnesium carbonate, said oxides are dolomitic quicklime, and said fluid has a pH of between about 8.5 and 9.5.

12. The drilling fluid defined in claim 2 wherein said solids additive system includes ground gypsum in an amount of from about 3 to 15 percent by weight.

13. The drilling fluid of claim 2 containing a weight material in an amount sufficient to provide a mud density of at least 12 pounds per barrel.

14. An acid soluble drilling fluid according to claim 13 wherein said weight material comprises finely ground ion oxide.

15. The drilling fluid of claim 2 wherein said brine solution contains, in addition to the components of said solid additive system, from 15 to 175 pounds per barrel of dissolved salts selected from the group of sodium chloride, potassium chloride, and magnesium chloride.

16. A clay free drilling fluid comprising
    from 5 to 175 pounds per barrel of a solid additive system containing 30 to 70 percent by weight dolomite, 20 to 60 percent by weight magnesium sulfate, 3 to 10 percent by weight of at least one of the oxides of calcium or magnesium, and 3 to 15 percent by weight gypsum;
    starch in an amount sufficient to provide desired fluid loss properties,
        said solid additive system being admixed in a brine solution containing 15 to 175 pounds per barrel of dissolved salts corresponding to salts anticipated in the formations to be drilled.

17. The drilling fluid of claim 16 wherein said oxides of calcium and magnesium are present in the form of dolomitic quicklime.

18. The drilling fluid of claim 16 including iron oxide as a weighting material.

19. The drilling fluid of claim 16 wherein said starch is a mixture of 3 parts by weight pregelatinized corn starch and 1 part by weight tapioca flour.

20. The drilling fluid of claim 16 wherein the salts in said brine solution comprise, in addition to the components of said additive system, potassium chloride and magnesium chloride.

* * * * *

UNITED STATES PATENT OFFICE
CERTIFICATE OF CORRECTION

Patent No. 3,878,110     Dated April 15, 1975

Inventor(s) George L. Miller and Horst K. F. Barthel

It is certified that error appears in the above-identified patent and that said Letters Patent are hereby corrected as shown below:

Column 4, line 3, "clacium" should read --calcium--.

Columns 5 and 6, in Table I at bottom of page, change headings "$MgSO_1$" and "$CaSO_1$" to --$MgSO_4$-- and --$CaSO_4$--, respectively.

Column 13, line 28, "vescosity" should read --viscosity--.

Column 13, lines 29 and 30, "de-nisty" should read --density--.

Signed and Sealed this twenty-third Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,878,110                    Dated   April 15, 1975

Inventor(s)   George L. Miller and Horst K. F. Barthel

It is certified that error appears in the above-identified patent and that said Letters Patent are hereby corrected as shown below:

IN THE SPECIFICATION:

Column 5, line 46, "20 or 22 pounds per barrel" should read --20 or 22 pounds per gallon--.

IN THE CLAIMS:

Claim 1, line 7, "12 to 20 pounds per barrel" should read --12 to 20 pounds per gallon--.

Claim 13, line 3, "12 pounds per barrel" should read --12 pounds per gallon--.

Signed and Sealed this

Twenty-eighth Day of June 1977

[SEAL]

Attest:

RUTH C. MASON
Attesting Officer

C. MARSHALL DANN
Commissioner of Patents and Trademarks